US012736178B2

(12) United States Patent
Yun et al.

(10) Patent No.: US 12,736,178 B2
(45) Date of Patent: Sep. 15, 2026

(54) LUBRICATABLE CAB MOUNTING ASSEMBLY

(71) Applicants: Hyundai Motor Company, Seoul (KR); Kia Corporation, Seoul (KR)

(72) Inventors: Sun-Hyuk Yun, Suwon-Si (KR); Chan-Kyu Yang, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 604 days.

(21) Appl. No.: 18/212,557

(22) Filed: Jun. 21, 2023

(65) Prior Publication Data

US 2024/0044448 A1 Feb. 8, 2024

(30) Foreign Application Priority Data

Aug. 3, 2022 (KR) ........................ 10-2022-0096934

(51) Int. Cl.
*F16N 1/00* (2006.01)
*B62D 33/067* (2006.01)
*F16C 11/04* (2006.01)

(52) U.S. Cl.
CPC ............. *F16N 1/00* (2013.01); *B62D 33/067* (2013.01); *F16C 11/045* (2013.01)

(58) Field of Classification Search
CPC .... B62D 33/067; F16C 11/045; F16C 33/102; E05D 11/02; F16F 9/3278; F16N 1/00
USPC ............ 296/190.05; 384/292, 291, 286, 283, 384/120, 322
See application file for complete search history.

(56) References Cited

U.S. PATENT DOCUMENTS 1,236,511 A * 8/1917 Waring ................. F16C 17/028 384/291
2,249,843 A * 7/1941 Marsland .................. F04D 3/02 384/292
2,625,448 A * 1/1953 Underwood ........ F16C 33/1065 384/291
4,558,960 A * 12/1985 Lehtinen ............... F16C 33/106 384/373
5,632,066 A * 5/1997 Huong .................. G06F 1/1681 403/68
7,785,013 B2 * 8/2010 Egami ..................... F16C 17/02 384/283

(Continued)

FOREIGN PATENT DOCUMENTS

CN 111911509 A * 11/2020 .............. E02F 9/006
CN 117553070 A * 2/2024 ............ F16C 11/045

(Continued)

*Primary Examiner* — Hilary L Gutman
(74) *Attorney, Agent, or Firm* — MORGAN, LEWIS & BOCKIUS LLP

(57) ABSTRACT

A cab mounting assembly connecting a cab and a frame is configured so that grease is supplied to contact portions to prevent wear and noise. The cab mounting assembly hinge-connects a frame of a vehicle and a cab in which an occupant sits. A collar is disposed outside a fixing bolt hinge-connecting the frame and the cab. A hinge cushion is fitted around the collar to buffer vibration transmitted to the cab. At least one surface of an internal surface of the hinge cushion and an external surface of the collar is provided with a groove through which oil supplied into the hinge cushion flows to an end portion of the hinge cushion.

17 Claims, 11 Drawing Sheets

(56) References Cited

U.S. PATENT DOCUMENTS

| | | | | |
|---|---|---|---|---|
| 8,657,499 | B2 * | 2/2014 | Tung | F16C 33/108 384/129 |
| 9,103,377 | B2 * | 8/2015 | Lee | F16C 35/077 |
| 10,717,476 | B2 | 7/2020 | Lee et al. | |
| 2004/0042698 | A1 * | 3/2004 | Yamamoto | F16C 33/1025 384/291 |
| 2007/0119026 | A1 * | 5/2007 | Lee | G06F 1/1616 16/342 |
| 2008/0152271 | A1 * | 6/2008 | Barlerin | F16C 23/045 384/322 |
| 2009/0268996 | A1 * | 10/2009 | Yamamoto | F16C 17/02 384/291 |
| 2022/0388365 | A1 * | 12/2022 | Monroe | F16C 33/1045 |
| 2025/0334150 | A1 * | 10/2025 | Babic | F16C 33/20 |

FOREIGN PATENT DOCUMENTS

| | | | | | |
|---|---|---|---|---|---|
| JP | H0592070 | U | * | 12/1993 | |
| JP | H05319314 | A | * | 12/1993 | |
| JP | H0619175 | B2 | * | 3/1994 | |
| JP | 10204770 | A | * | 8/1998 | |
| KR | 20040104182 | A | * | 12/2004 | |
| KR | 20070036422 | A | * | 4/2007 | B62D 33/0604 |
| KR | 20070065029 | A | * | 6/2007 | B62D 33/067 |
| KR | 101216339 | B1 | * | 12/2012 | C23C 10/60 |
| KR | 10-2019-0057863 | A | | 5/2019 | |

* cited by examiner

LUBRICATABLE CAB MOUNTING ASSEMBLY

CROSS-REFERENCE TO RELATED APPLICATION

The present application claims priority to Korean Patent Application No. 10-2022-0096934, filed on Aug. 3, 2022, the entire contents of which is incorporated herein for all purposes by this reference.

BACKGROUND OF THE PRESENT DISCLOSURE

Field of the Present Disclosure

The present disclosure relates to a cab mounting assembly connecting a cab and a frame, and more particularly, to a lubricatable cab mounting assembly being configured so that grease may be supplied to contact portions to prevent wear and noise.

Description of Related Art

In a commercial vehicle, such as a truck, a cab in which an occupant sits is mounted on a frame.

As illustrated in FIG. 1, a cab hinge bracket 111 is fastened to a chassis frame, and is hinged to a cab upper bracket 112 fastened to the lower portion of a cab 101. Because the cab 101 is hinged at the front end of the chassis frame, the cab 101 may be tilted for maintenance or repair of the engine, the chassis, or the like.

Meanwhile, a hinge cushion 120 is applied to a portion at which the cab hinge bracket 111 and the cab upper bracket 112 are hinged to each other to prevent vibration and noise occurring during traveling.

The hinge cushion 120 includes a cushion rubber 123 between an external housing 121 and an internal housing 122 each having the shape of a cylinder, and is configured so that an internal sleeve 124 is integrally fitted into the internal housing 122.

An external housing 121 of the hinge cushion 120 is fixed by a cab hinge cover 115 fastened to the cab hinge bracket 111 at the top end of the cab hinge bracket 111. Furthermore, in the hinge cushion 120, a fixing bolt 133 extending through a connecting arm bracket 113 provided on one end of a connecting arm connected to the cab upper bracket 112 extends through the internal sleeve 124 and is fastened with a fixing nut 134. A collar 132 is mounted between the fixing bolt 133 and the internal sleeve 124, and side stoppers 131 are fitted around both ends of the collar 132, contacted on the internal surface of the connecting arm bracket 113 and one end of the hinge cushion 120. The side stoppers 131 serve to provide a buffer between the connecting arm bracket 113 and the hinge cushion 120 during traveling of a vehicle.

A cab spring 117 is disposed between the cab upper bracket 112 and the connecting arm to provide a buffer, and a cab stay 116 connecting the connecting arm and the chassis frame is disposed.

Meanwhile, the cab 101 is caused to move by the traveling, and the internal sleeve 124 is worn by recurrence of such movement. Not only durability is reduced by the wear, but also friction noise is generated by the wear of the internal sleeve 124. Furthermore, as a gap is increased by the friction, another member may collide with the internal sleeve 124, generating another noise.

This may occur not only in the internal sleeve 124 but also in portions that pivot while being in contact with each other.

Meanwhile, in an eco-friendly vehicle in which engine noise does not occur during traveling due to electrification of the vehicle, noise may be more loudly transmitted to the occupant.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lubricatable cab mounting assembly facilitating grease to be supplied to contact portions, preventing wear and noise.

In one aspect, the present disclosure provides a lubricatable cab mounting assembly hinge-connecting a frame of a vehicle and a cab in which an occupant sits. The lubricatable cab mounting assembly may include: a collar disposed outside a fixing bolt hinge-connecting the frame and the cab; and a hinge cushion fitted around the collar to buffer vibration transmitted to the cab. At least one surface of an internal surface of the hinge cushion and an external surface of the collar may be provided with a groove through which oil supplied into the hinge cushion flows to an end portion of the hinge cushion.

The hinge cushion may include: an external housing; an internal housing positioned inside the external housing at a predetermined distance from the external housing; a cushion rubber filling a space between the external housing and the internal housing; and an internal sleeve provided inside the internal housing and being in contact with the collar. An internal surface of the internal sleeve may be provided with an internal groove through which the oil flows.

The internal groove may include a spiral shape.

The cushion rubber may include a protrusion on one end portion of the cushion rubber to protrude in a circumferential direction of the hinge cushion.

The protrusion may include cushion grooves provided at predetermined distances from each other in the circumferential direction of the hinge cushion to fluidically communicate with each other in a radial direction of the hinge cushion. A first communication groove may be provided on one end portion of the internal housing to fluidically communicate with the cushion grooves. A second communication groove may be provided on one end portion of the internal sleeve to fluidically communicate with the first communication groove. The cushion grooves, the first communication groove, and the second communication groove may communicate with each other to form a radial groove so that the oil flows from external circumferential surfaces of the hinge cushion into the hinge cushions.

The internal groove may communicate with the cushion grooves.

The hinge cushions may be disposed so that the protrusions thereof are butted against each other, constructing a hinge cushion unit.

The two hinge cushions may be disposed to be in contact with each other so that the cushion grooves of one of the two hinge cushions coincide with the cushion grooves of another of the two hinge cushions.

The hinge cushion unit may include a center groove defined by the protrusions. The center groove may allow the oil to flow in a circumferential direction of the hinge cushions.

The lubricatable cab mounting assembly may further include a side stopper provided on a first end portion of the hinge cushion opposite to a second end portion of the hinge cushion on which the protrusion is provided, the side stopper being configured to provide a buffer between the hinge cushion and a connecting arm bracket connected to the cab.

The side stopper may include a through-hole extending therethrough. The internal groove may communicate with the through-hole.

The lubricatable cab mounting assembly may further include a sealing lip fitted to the protrusion to block the oil from leaking in an axial direction of the hinge cushion.

An external circumferential portion of the hinge cushion may be fixed by a cab hinge bracket fastened to the frame and a cab hinge cover fastened to the cab hinge bracket. The fixing bolt extending through a connecting arm bracket connected to the cab may extend through the hinge cushion.

The cab hinge bracket may be provided with an oil supply line through which the oil is supplied to the hinge cushion.

The oil supply line may be connected to contact portions of the two hinge cushions butted against each other.

According to the lubricatable cab mounting assembly according to an exemplary embodiment of the present disclosure, when the lubricatable cab mounting assembly is configured so that grease is injected through the nipple, after the grease is supplied into the hinge cushion, the grease may be supplied between the internal sleeve and the collar, between the side stoppers and the connecting arm bracket, and the like to be applied thereon.

Because the grease is supplied to the portions operating while being in contact with each other, friction may be reduced, delaying wear and reducing noise.

As the noise is reduced, quietness within a vehicle during traveling is improved. As the wear is delayed, durability is improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
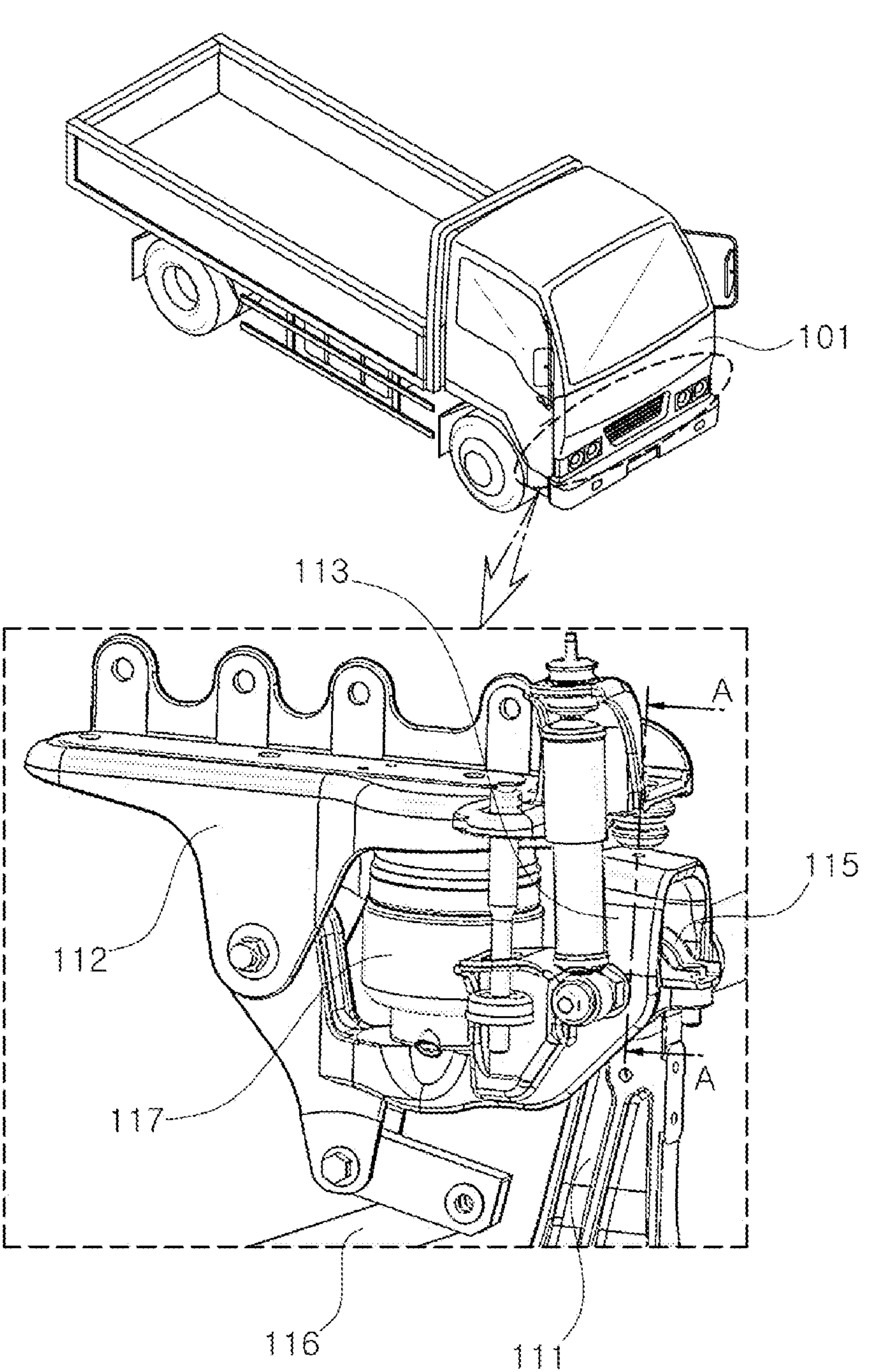
FIG. 1 is a perspective view exemplarily illustrating typical connecting portions of a cab and a frame.
Figure 2:
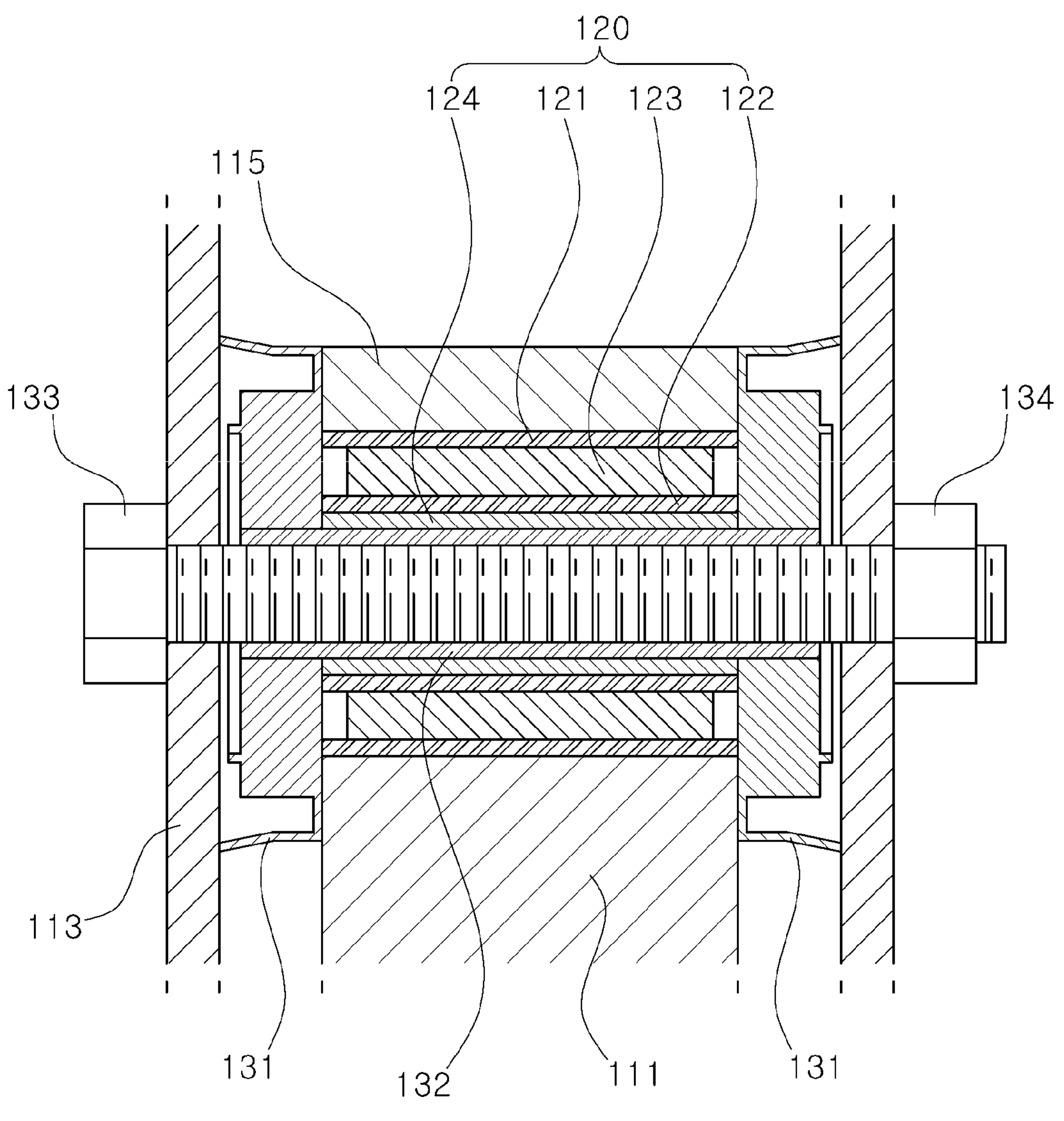
FIG. 2 is a cross-sectional view taken along line A-A in FIG. 1 to illustrate the structure of a hinge cushion according to the related art.
Figure 3:
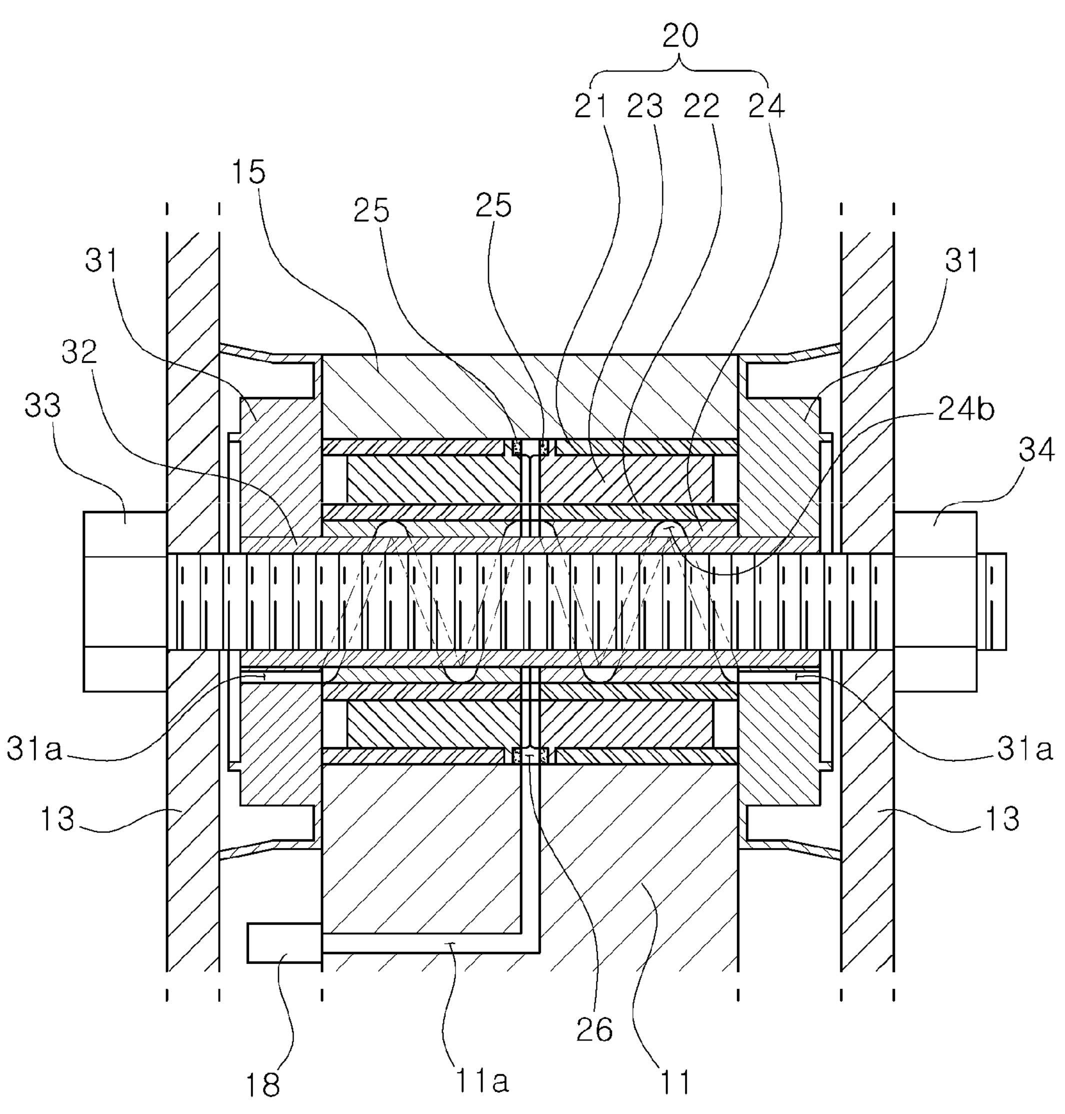
FIG. 3 is a cross-sectional view exemplarily illustrating a state in which the lubricatable cab mounting assembly according to an exemplary embodiment of the present disclosure is mounted.
Figure 4:
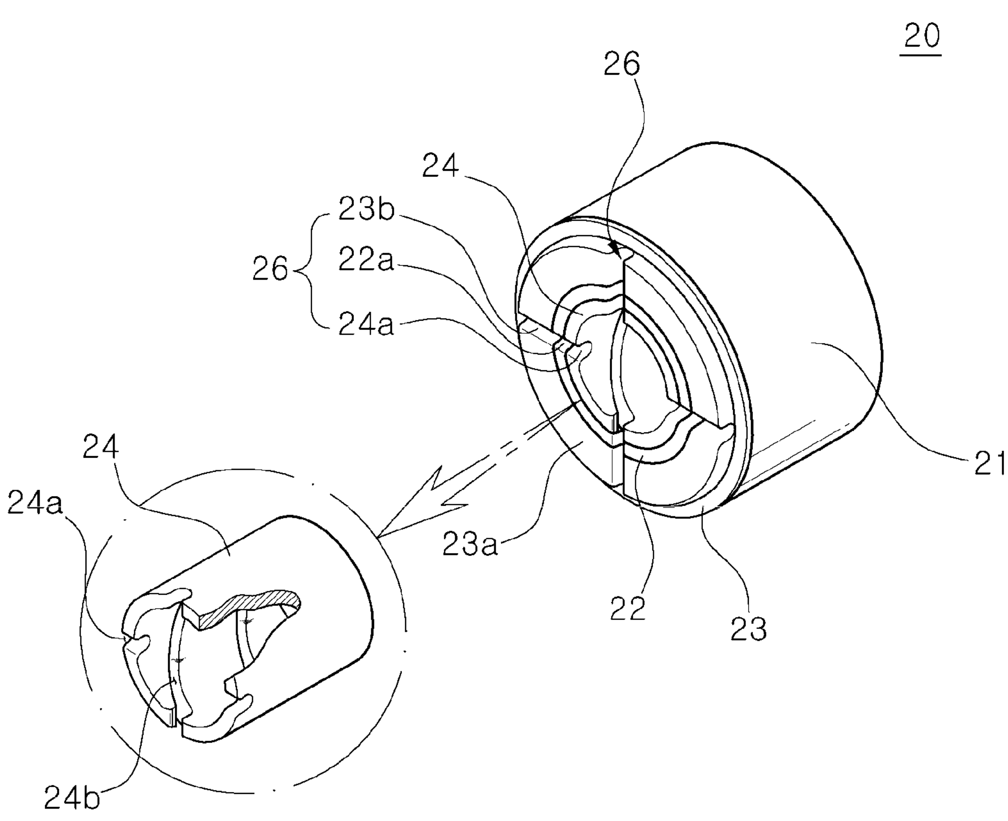
FIG. 4 is a perspective view exemplarily illustrating the hinge cushion in the lubricatable cab mounting assembly according to an exemplary embodiment of the present disclosure.
Figure 5:
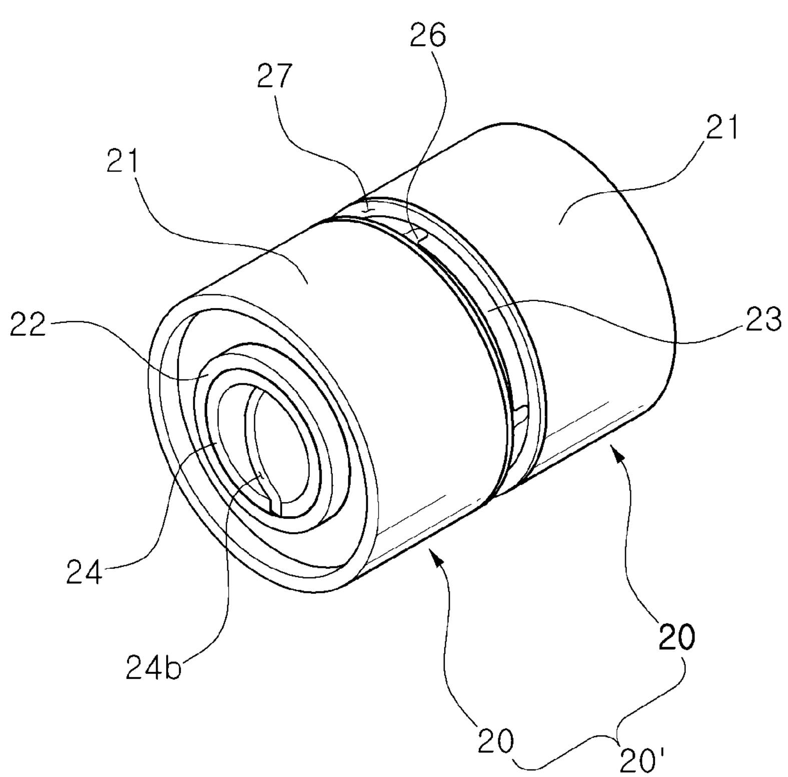
FIG. 5 is a perspective view exemplarily illustrating a state in which the hinge cushions are fitted to each other in the lubricatable cab mounting assembly according to an exemplary embodiment of the present disclosure.
Figure 6:
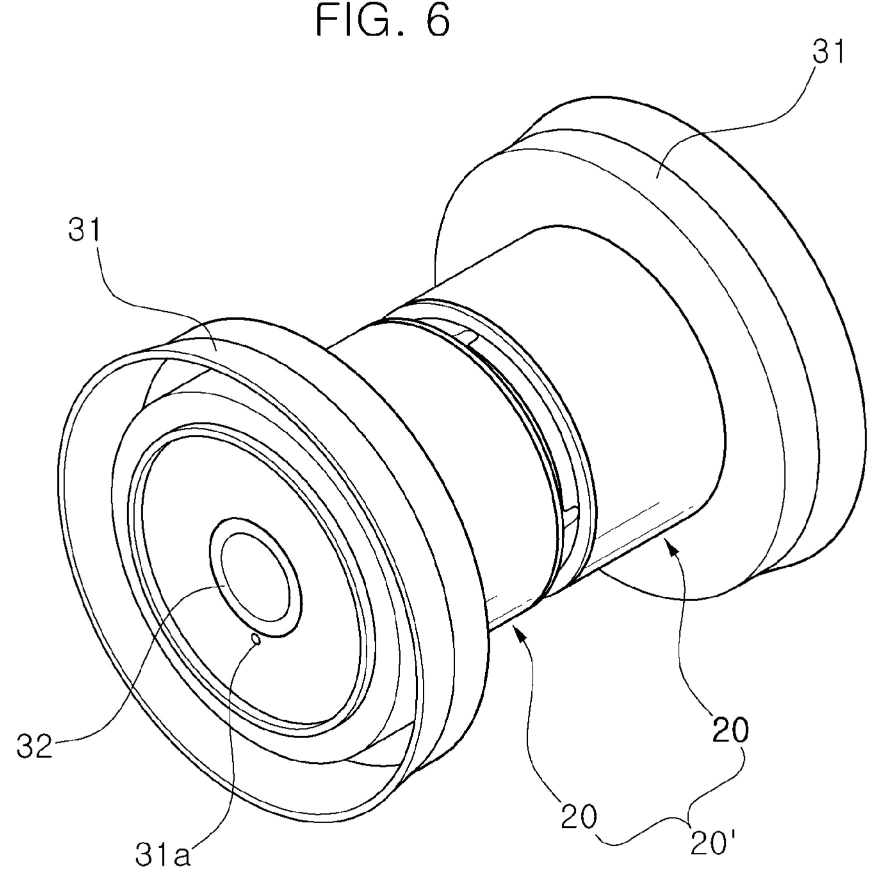
FIG. 6 is a perspective view exemplarily illustrating a state in which the collar and the side stoppers are fitted to the hinge cushions in the lubricatable cab mounting assembly according to an exemplary embodiment of the present disclosure.
Figure 7:
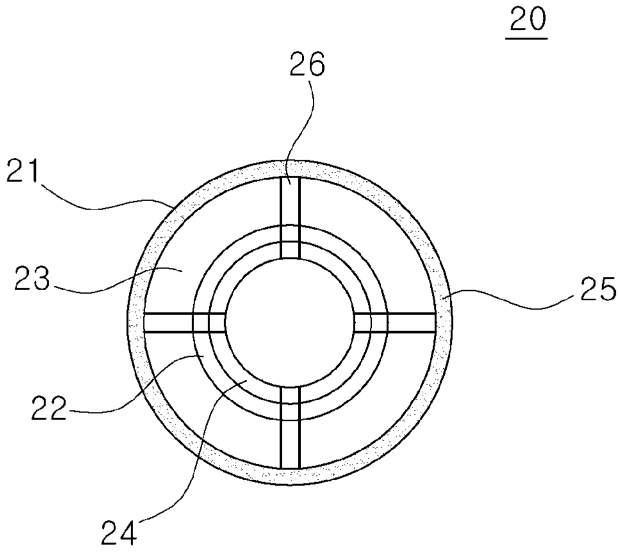
FIG. 7 is a side view exemplarily illustrating the hinge cushion in the lubricatable cab mounting assembly according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a lubricatable cab mounting assembly according to an exemplary embodiment of the present disclosure will be described in detail with reference to the drawings.

The lubricatable cab mounting assembly according to an exemplary embodiment of the present disclosure is a cab mounting assembly hinge-connecting a vehicle frame and a cab 101 in which an occupant sits. The lubricatable cab mounting assembly includes: a collar 32 disposed around a fixing bolt 33 hinge-connecting the frame and the cab 101; and hinge cushions 20 fitted around the collar 32 to buffer vibration transmitted to the cab 101. An internal groove 24*b* is formed in at least one of the internal surface of each of the hinge cushions 20 and the external surface of the collar 32, and includes a configuration allowing oil supplied into the hinge cushions 20 to flow toward end portions of the hinge cushions 20.

A commercial vehicle such as a truck includes a structure in which the cab 101 in which an occupant sits is mounted on the frame of the vehicle. The front end portion of the cab 101 is hinged to the front end portion of the frame, and the rear end portion of the cab 101 is fixed to the frame. When maintenance or repair are required for the vehicle, the maintenance or repair are performed by lifting the rear end portion of the cab 101.

A portion of the cab 101 hinged to the frame is hinged to the frame by fastening a connecting arm bracket 13 mounted on the front bottom end of the cab 101 and a cab hinge bracket 11 fastened to the frame using a fixing bolt 33 and a fixing nut 34. The hinge cushions 20 for providing a buffer are mounted between the connecting arm bracket 13 and the cab hinge bracket 11.

The hinge cushion 20 includes a buffering cushion rubber 23 between an external housing 21 and an internal housing 22, each of which includes the shape of a cylinder and is formed of a steel material. An internal sleeve 24 is fitted into the internal housing 22.

The hinge cushion 20 according to an exemplary embodiment of the present disclosure is configured so that the cushion rubber 23 is exposed at one end portion of the hinge cushion 20. The cushion rubber 23 includes a protrusion **23*a* formed on one end portion of the hinge cushion 20 in the circumferential direction of the hinge cushion 20. The protrusion 23*a* is designed to form a radial groove 27 allowing lubricating oil, such as grease, to flow radially in the circumferential direction of the hinge cushions 20 when two hinge cushions 20 butted against each other are disposed between the connecting arm bracket 13 and the cab hinge bracket 11. The protrusion 23*a* has cushion grooves 23*b* formed at predetermined distances from each other, the cushion grooves 23*b* fluidically-communicating with each other in the radial direction of the hinge cushion 20. The cushion grooves 23*b* are configured to serve as passages through which the oil flows from the external circumferential surface of the hinge cushion 20 into the hinge cushion 20**.

First communication grooves **22*a* and second communication grooves 24*a* fluidically-communicating with the cushion grooves 23*b* are formed on one end portion of the internal housing 22 and one end portion of the internal sleeve 24**.

The cushion grooves **23*b*, the first communication grooves 22*a*, and the second communication grooves 24*a* communicate with each other, forming the radial groove 27 provided as a passage through which the oil may flow from the external circumferential surface of the hinge cushion 20 into the hinge cushion 20**.

Two hinge cushions 20 are provided by butting the hinge cushions 20 against each other so that the protrusions **23*a* are in contact with each other. When a single hinge cushion unit 20' is constructed by arranging two hinge cushions 20 to be in contact with each other in a line symmetrical manner, a center groove 26 allowing the oil to flow therethrough is formed in a middle portion of the hinge cushion unit 20' in the circumferential direction thereof. That is, the center groove 26 includes spaces defined by the protrusions 23*a* protruding from the corresponding end portions of the cushion rubbers 23. The hinge cushion unit 20' is constructed by arranging the two hinge cushions 20 to be butted against each other, inserting the collars 32 into the hinge cushions 20, and coupling side stoppers 31 to (external end portions of the hinge cushions 20 corresponding to) both end portions of the hinge cushion unit 20'**.

Furthermore, the internal groove **24*b* allowing the oil to move from one end portion to the other end portion of the hinge cushion 20 is formed in the internal surface of the internal sleeve 24**.

The side stoppers 31 are mounted on both end portions of the hinge cushion unit to buffer impact between the hinge cushion unit 20' and the connecting arm bracket 13 by movement of the cab 101 during traveling of the vehicle.

The side stopper 31 includes a through-hole **31*a* extending through the side stopper 31. The through-hole 31*a* is configured to fluidically communicate with the internal groove 24*b*. Due to the present configuration, the oil that has flown through the internal grooves 24*b* flows through the side stoppers 31, i.e., through the through-holes 31*a* of the side stoppers 31**.

The cylindrical collar 32 is fitted into the hinge cushions 20 of the hinge cushion unit 20' to be positioned between the internal sleeve 24 and the fixing bolt 33. In the fastening of the fixing bolt 33, the collar 32 is positioned inside the connecting arm bracket 13 and supports the connecting arm bracket 13 so as not to press the hinge cushion unit 20'.

Because the external circumferential surface of the collar 32 is in contact with the internal surface of the internal sleeve 24, wear and noise may occur from the contact surfaces.

To prevent this, the internal groove **24*b* is formed in the internal surface of the internal sleeve 24 to allow the oil to be supplied between the external circumferential surface of the collar 32 and the internal surface of the internal sleeve 24. The passage through which the oil is supplied may be formed in the external circumferential surface of the collar 32, but may be formed in the internal surface of the internal sleeves 24** formed of a synthetic resin.

The internal groove **24*b* is formed in the shape of a spiral. Because the internal grove 24*b* is formed in the shape of a spiral, the oil may be uniformly applied in the circumferential direction and the longitudinal direction between the external circumferential surface of the collar 32 and the internal surface of the internal sleeve 24**.

The hinge cushion unit 20' is fixed to the cab hinge bracket 11 by fastening a cab hinge cover 15 to the cab hinge bracket 11 in a state in which the hinge cushion unit 20' is accommodated on the cab hinge bracket 11. Here, in the hinge cushion 20, sealing lips are fitted to the protrusions **23*a* to prevent the oil flowing through the center groove 26** from leaking.

Furthermore, the hinge cushion unit 20' is positioned inside the connecting arm bracket 13, and is mounted on the connecting arm bracket 13 using the fixing bolt 33 extending through the hinge cushion unit 20' and the connecting arm bracket 13.

Thus, the hinge cushions 20 are mounted between the cab hinge bracket 11 and the connecting arm bracket 13 so that the cab hinge bracket 11 and the connecting arm bracket 13 are hinged to each other.

The cab hinge bracket 11 is provided with an oil supply line **11*a* fluidically-communicating with the center groove 26. Oil may be supplied from an external source to the hinge cushion unit 20' through a nipple 18 of the oil supply line 11*a*. The oil supply line 11*a* is connected to the contact portions of the two hinge cushions 20** butted against each other.

A process of supplying oil through the lubricatable cab mounting assembly including the above-described configuration according to an exemplary embodiment of the present disclosure will now be described hereinafter.

Figure 8:
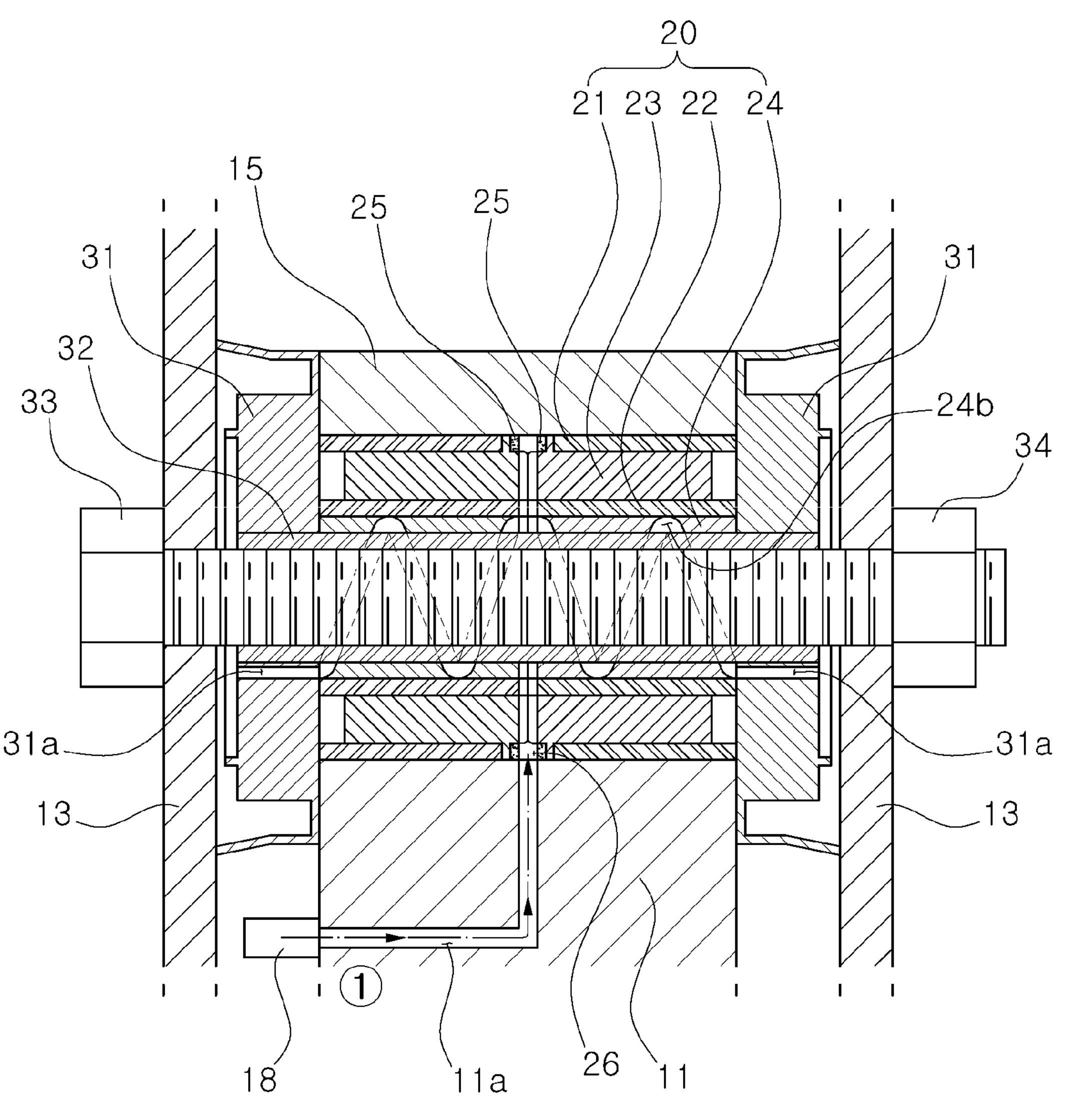
FIG. 8, FIG. 9, FIG. 10 and FIG. 11 are schematic views exemplarily illustrating a process of supplying grease in the lubricatable cab mounting assembly according to an exemplary embodiment of the present disclosure.

As illustrated in FIG. 8, oil, i.e., grease, is supplied through the nipple 18 from an external source. The oil supplied through the nipple 18 is supplied toward the hinge cushion 20 through the oil supply line **11*a* (see ① in FIG. 8**).

Figure 9:
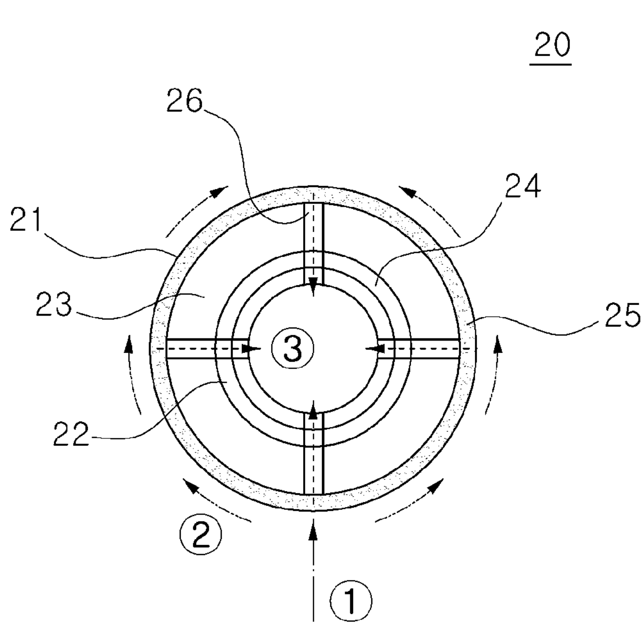

The oil supplied toward the hinge cushion 20 is supplied to flow around the hinge cushion 20 through the radial groove 27 (see ② in FIG. 9). Furthermore, the oil is supplied into the hinge cushion 20 through the center groove 26 while moving through the radial groove 27 (see ③ in FIG. 9).

Figure 10:
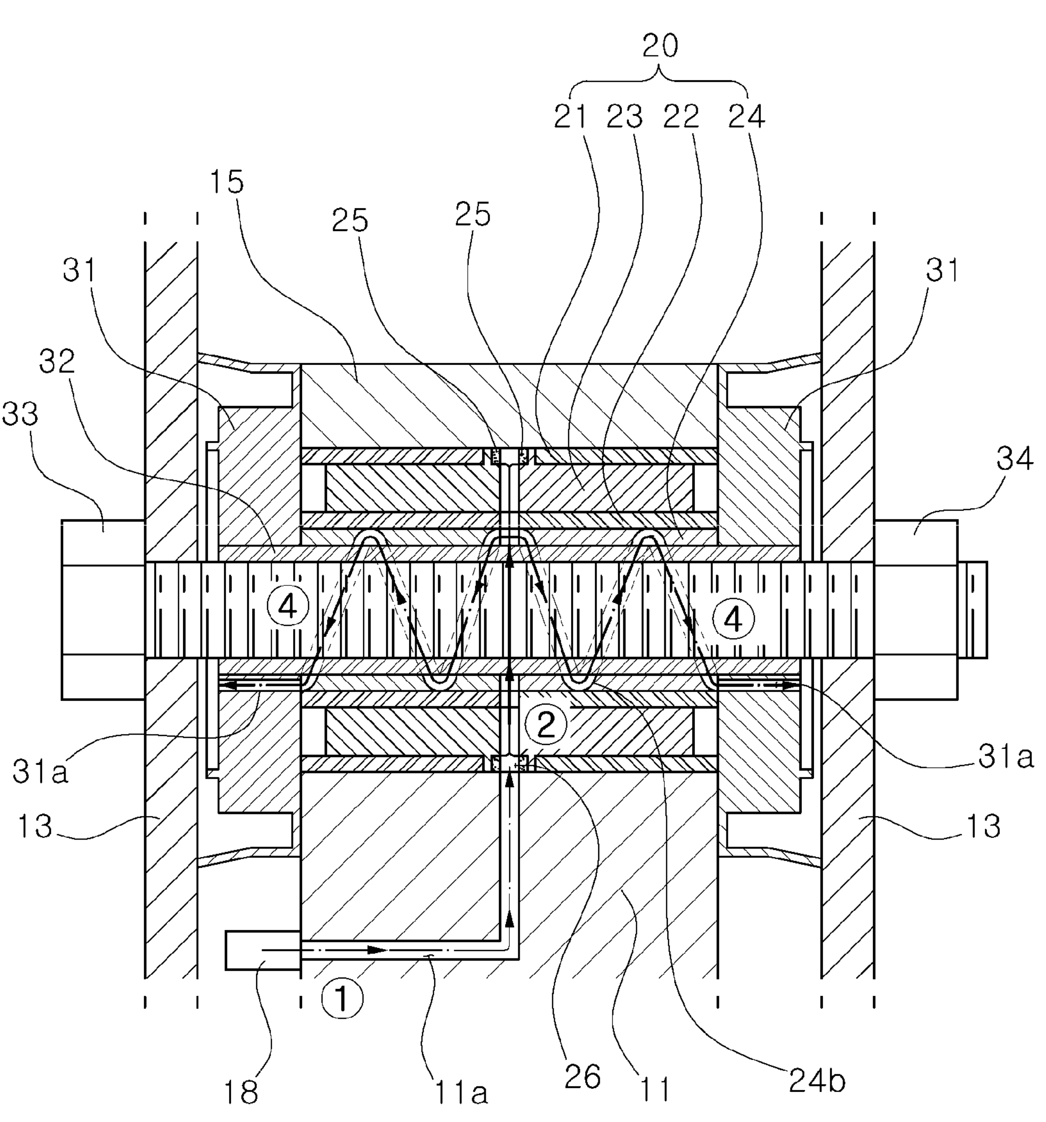

Afterwards, the oil is supplied from one end portion of the hinge cushion 20 to the other end portion of the hinge cushion 20 through the internal groove 24*b* (see ④ in FIG. 10). The internal groove 24*b* includes the contact surfaces of the internal sleeve 24 and the collar 32, and is configured as a passage through which the oil is supplied. Furthermore, because the internal groove 24*b* is formed in the shape of a spiral in the internal surface of the internal sleeve 24, the internal groove 24*b* may supply the oil to the entire external circumferential surface of the collar 32 while causing the oil to spirally flow along the external circumferential surface of the collar 32.

Because the oil is applied on the contact surfaces of the internal sleeve 24 and the collar 32, the oil may prevent wear and noise from occurring between the internal sleeve 24 and the collar 32.

Figure 11:
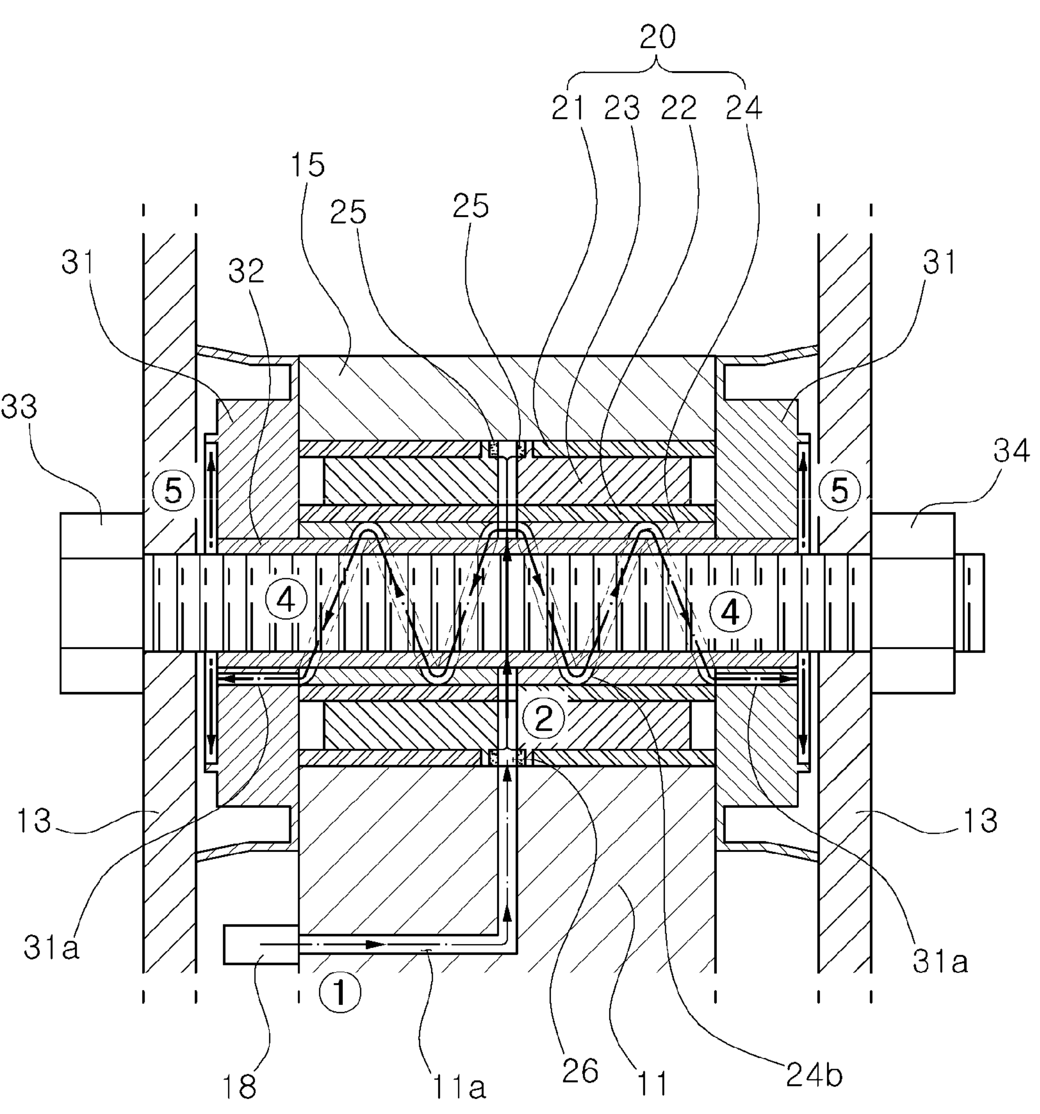

The oil that has flown through the internal groove 24*b* flows to the other end portion of the internal sleeve 24, passes through the through-hole 31*a* of the side stoppers 31, and then is supplied between the side stoppers 31 and the connecting arm bracket 13. Consequently, it is possible to prevent friction noise occurring between the side stoppers 31 and the connecting arm bracket 13 due to the movement of the cab 101 during traveling of a vehicle, preventing the contact portions from corroding (see ⑤ in FIG. 11).

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A lubricatable cab mounting assembly hinge-connecting a frame of a vehicle and a cab in which an occupant sits, the lubricatable cab mounting assembly comprising:

a collar disposed outside a fixing bolt hinge-connecting the frame and the cab; and a hinge cushion fitted around the collar to buffer vibration transmitted to the cab, wherein an internal surface of the hinge cushion is provided with a groove through which oil supplied into the hinge cushion flows to an end portion of the hinge cushion, and wherein the hinge cushion includes:

an external housing;

an internal housing positioned inside the external housing at a predetermined distance from the external housing to form a space therebetween; and a cushion rubber filling the space between the external housing and the internal housing, wherein the cushion rubber includes a protrusion on one end portion of the cushion rubber to protrude in a circumferential direction of the hinge cushion, and wherein the groove is formed in the protrusion and the groove of the protrusion includes:

cushion grooves provided at predetermined distances from each other in the circumferential direction of the hinge cushion to fluidically communicate with each other in a radial direction of the hinge cushion, a first communication groove provided on one end portion of the internal housing to fluidically communicate with the cushion grooves, and a second communication groove provided on one end portion of an internal sleeve to fluidically communicate with the first communication groove.

2. The lubricatable cab mounting assembly of claim 1, wherein the hinge cushion further includes:

the internal sleeve provided inside the internal housing and being in contact with the collar, wherein an internal surface of the internal sleeve is provided with the groove through which the oil flows.

3. The lubricatable cab mounting assembly of claim 2, wherein the groove includes a spiral shape.

4. The lubricatable cab mounting assembly of claim 2, wherein the cushion grooves, the first communication groove, and the second communication groove fluidically communicate with each other to form the groove in the hinge cushion so that the oil flows from an external circumferential surface of the hinge cushion into the hinge cushion therethrough.

5. The lubricatable cab mounting assembly of claim 1, wherein the groove fluidically communicates with the cushion grooves.

6. The lubricatable cab mounting assembly of claim 1, wherein the hinge cushion is in plural and adjacent hinge cushions are disposed so that protrusions thereof are butted against each other, constructing a hinge cushion unit.

7. The lubricatable cab mounting assembly of claim 6, wherein the adjacent hinge cushions of the hinge cushion unit are disposed to be in contact with each other so that a cushion groove of one of the adjacent hinge cushions coincide with a cushion groove of another of the adjacent hinge cushions.

8. The lubricatable cab mounting assembly of claim 6, wherein the hinge cushion unit includes a center groove defined by the protrusions, the center groove allowing the oil to flow in a circumferential direction of the adjacent hinge cushions.

9. The lubricatable cab mounting assembly of claim 6, wherein external circumferential portions of the adjacent hinge cushions of the hinge cushion unit are fixed by a cab hinge bracket fastened to the frame and a cab hinge cover fastened to the cab hinge bracket, and wherein the fixing bolt extending through a connecting arm bracket connected to the cab extends through the plurality of the hinge cushions.

10. The lubricatable cab mounting assembly of claim 9, wherein the cab hinge bracket is provided with an oil supply line through which the oil is supplied to the plurality of the hinge cushions.

11. The lubricatable cab mounting assembly of claim 10, wherein the oil supply line is connected to contact portions of the adjacent hinge cushions butted against each other.

12. The lubricatable cab mounting assembly of claim 2, further including a side stopper provided on a first end portion of the hinge cushion opposite to a second end portion of the hinge cushion on which the protrusion is provided, the side stopper being configured to provide a buffer between the hinge cushion and a connecting arm bracket connected to the cab.

13. The lubricatable cab mounting assembly of claim 12, wherein the side stopper includes a through-hole extending therethrough, and wherein the internal groove fluidically communicates with the through-hole.

14. The lubricatable cab mounting assembly of claim 2, further including a sealing lip fitted to the protrusion to block the oil from leaking in an axial direction of the hinge cushion.

15. The lubricatable cab mounting assembly of claim 1, wherein an external circumferential portion of the hinge cushion is fixed by a cab hinge bracket fastened to the frame and a cab hinge cover fastened to the cab hinge bracket, and wherein the fixing bolt extending through a connecting arm bracket connected to the cab extends through the hinge cushion.

16. The lubricatable cab mounting assembly of claim 15, wherein the cab hinge bracket is provided with an oil supply line through which the oil is supplied to the hinge cushion.

17. The lubricatable cab mounting assembly of claim 16, wherein the oil supply line is connected to contact portions of two hinge cushions butted against each other.

* * * * *